Jan. 1, 1929.
J. O. SCHULTE
CLOSET SEAT
Filed Oct. 14, 1927
1,697,663
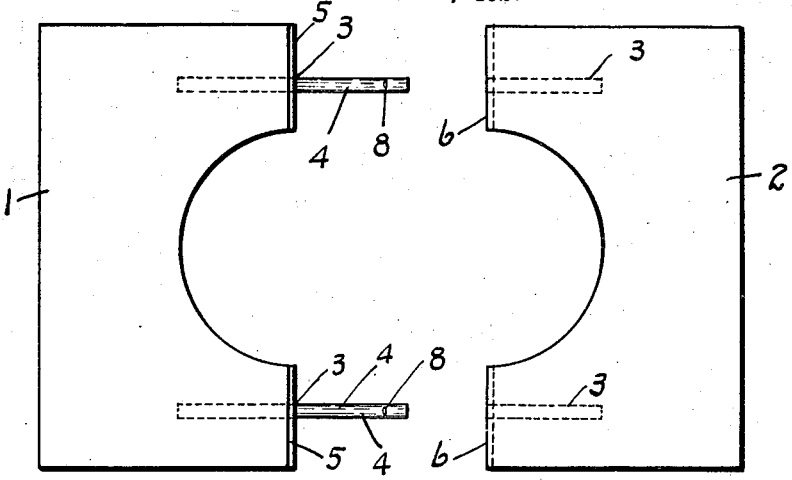
Fig. 1
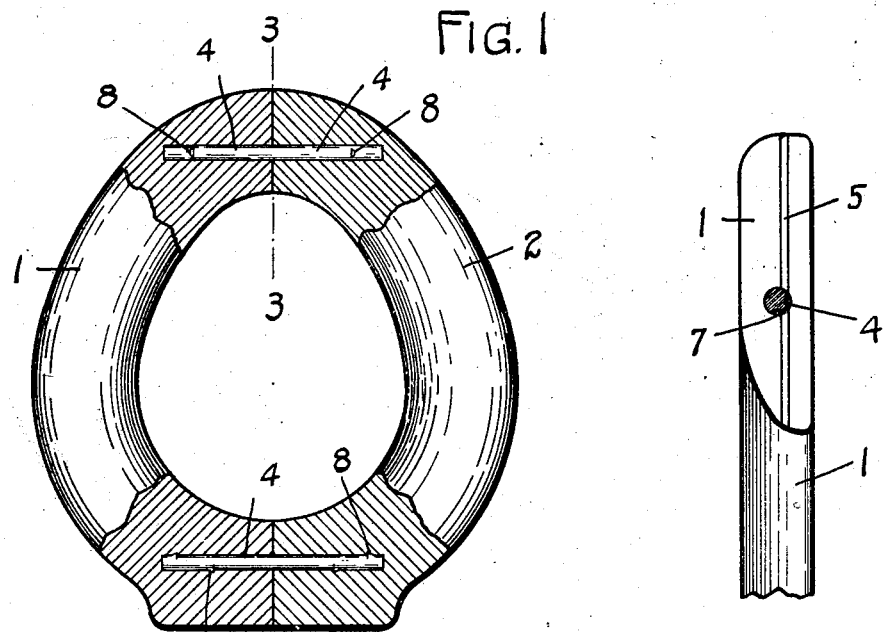 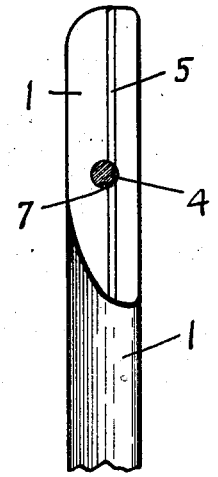
Fig. 2.    Fig. 3.
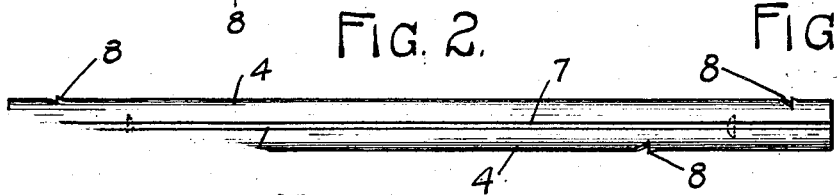
Fig. 4.
INVENTOR
John O. Schulte
By John Strehli
ATTORNEY.

Patented Jan. 1, 1929.

1,697,663

UNITED STATES PATENT OFFICE.

JOHN O. SCHULTE, OF CINCINNATI, OHIO, ASSIGNOR OF ONE-THIRD TO WILLIAM VAN AGTHOVEN AND ONE-THIRD TO MICHAEL MAES, BOTH OF CINCINNATI, OHIO.

CLOSET SEAT.

Application filed October 14, 1927. Serial No. 226,100.

At present closet seats, in order to strengthen them, are provided with wooden dowels at both the back and front middle part thereof.

This construction does not prevent them from cracking, warping and getting out of shape.

The object of my invention is to produce a closet seat which will not warp, will last longer, will not pull apart and which will remain in normal condition at all times, overcoming any objection to the ordinary seat now in use.

I accomplish this by using metal dowels instead of wooden ones, and form them of peculiar construction as set forth in detail.

My closet seat will not warp, will be longer lived, and will not pull apart. It will not crack and open up at any of the joints and which will be much stronger and more durable than the seat now in use.

Its various advantages and features will readily become apparent from the following description.

In the accompanying drawing forming part of this specification:

Fig. 1, is a plan view of two sections of the closet seat in the rough and spread apart for connecting them up with the dowels, Fig. 2, is a plan view of the same two sections, glued together, having the dowels in position and partly broken away to illustrate construction, Fig. 3, is a section on the line 3, 3 of Fig. 2, and Fig. 4 is a view in elevation of my new dowel which I use in making this closet seat.

The seat is made up of two pieces or parts 1 and 2. In Fig. 1, they are shown in the rough and when in this state the holes 3 into which the dowels 4 pass are bored. One half of the dowel 4 is then placed in one of the parts into the holes 3 and then the other part is put into a position where it can be shoved into place, the holes 3 passing over that part of the dowels 4 which extend inwardly beyond the other part. Glue is placed on the dowels 4 and on the meeting faces of the parts 1 and 2 before they are forced together.

Usually tongues as 5 are placed on one of the parts and recesse 6 on the opposite part, so that when they are forced together to meet, tongue 5 will enter the groove 6 and form a tongue joint to help hold the parts firmly together. When the parts shown in Fig. 1, are forced together and the dowels are in position after the proper gluing, the whole is finished up to form a seat as shown in Fig. 2. The dowel 4 is provided with a recess 7 through which any air passes out when the parts are fastened together to prevent the formation of any air pockets.

My dowels 4 are made of metal, preferably of steel and have burrs or tangs around their periphery at each end, so formed that they will resist any tendency to pull the sections 1 and 2 apart and as the dowels are lodged in place, they lock the parts 1 and 2 together against displacement. These burrs or tangs may be of any shape or size, in fact any kind of an interruption may be placed upon the dowels in order to prevent them from leaving their place after they are in position.

It will readily be seen that this seat is very strong and will not warp and that it will always retain its original normal shape and contour and is practically non-breakable.

While I have described one construction of my new closet seat, I wish to be understood as claiming any modified forms thereof or changes made therein which will fall within the scope of this specification and claims.

I may use my new device in connection with other articles, for example, I may use it in connection with the joints of tables, furniture and the like.

What I claim as new and my invention and desire to secure by Letters Patent is:—

1. A closet seat including sections having abutting ends, metal dowels joining the sections together, each of said dowels having a solid body provided with a plain external surface interrupted at its end portions at spaced points by barbs which are embedded in said sections, each dowel being provided with an elongated recess for the purposes set forth.

2. A closet seat including a plurality of sections having abutting ends, the abutting ends having aligned cylindrical bores, solid cylindrical metallic dowels occupying the bores and joining the sections together, each dowel having spaced barbs near its ends embedded in said sections, and each dowel being provided with a groove in its external surface extending from end to end of the dowel.

In testimony whereof, I affix my signature at the city of Cincinnati, county of Hamilton, and State of Ohio, this 4th day of October, 1927.

JOHN O. SCHULTE.